(12) United States Patent
Brandt et al.

(10) Patent No.: US 6,976,149 B1
(45) Date of Patent: Dec. 13, 2005

(54) MAPPING TECHNIQUE FOR COMPUTING ADDRESSES IN A MEMORY OF AN INTERMEDIATE NETWORK NODE

(75) Inventors: William P. Brandt, Groton, MA (US); Kenneth H. Potter, Raleigh, NC (US); Jonathan Rosen, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 535 days.

(21) Appl. No.: 09/790,968

(22) Filed: Feb. 22, 2001

(51) Int. Cl.[7] ............................................. G06F 12/00
(52) U.S. Cl. ..................................... 711/220; 711/209
(58) Field of Search ........................ 711/220, 202, 209, 711/211–212, 214, 217–218; 709/9, 22, 26

(56) References Cited

U.S. PATENT DOCUMENTS 5,694,178 A * 12/1997 Kim ........................... 348/699

OTHER PUBLICATIONS

U.S. Appl. No. 09/791,063, Rachepalli et al.
U.S. Appl. No. 09/791,074, Potter et al.
Cisco 7200 and NPE Hardware Overview, Cisco Systems, Inc. 1999, pp. 1-35.

* cited by examiner

*Primary Examiner*—Nasser Moazzami
(74) *Attorney, Agent, or Firm*—Cesari and McKenna, LLP

(57) ABSTRACT

A mapping technique allows a forwarding engine of an intermediate node to efficiently compute a starting address within an internal packet memory (IPM) configured to hold a packet received at the node. The starting address is used by direct memory access logic to merge a trailer of the packet stored in the IPM with a modified packet header generated by the forwarding engine. However, the size of the IPM is preferably not a binary number that can be easily manipulated by the forwarding engine when computing the starting address of the packet within the IPM. Therefore, the technique automatically adjusts the starting address to map to a correct location if the address exceeds the size of the IPM, while obviating the need for the forwarding engine to consider a wrap-around condition when computing the starting address.

24 Claims, 8 Drawing Sheets

MAPPING TECHNIQUE FOR COMPUTING ADDRESSES IN A MEMORY OF AN INTERMEDIATE NETWORK NODE

CROSS-REFERENCE TO RELATED APPLICATIONS

The present invention is related to the following co-pending and commonly assigned U.S. patent applications:

U.S. patent application Ser. No. 09/791,063 titled, High Performance Interface Logic Architecture of an Intermediate Network Node; and U.S. patent application Ser. No. 09/791,074 titled, Method and Apparatus for Controlling Packet Header Buffer Wrap Around in a Forwarding Engine of an Intermediate Network Node, each of which was filed on even date herewith and incorporated by reference as though fully set forth herein.

FIELD OF THE INVENTION

The present invention relates to intermediate nodes of a communications network and, in particular, to address computations directed to a memory resource of an intermediate node, such as an aggregation router, used in a communications network, such as a computer network.

BACKGROUND OF THE INVENTION

A computer network is a geographically distributed collection of interconnected communication links and segments for transporting data between nodes, such as computers. Many types of network segments are available, with the types ranging from local area networks (LAN) to wide area networks (WAN). For example, the LAN may typically connect personal computers and workstations over dedicated, private communications links, whereas the WAN may connect large numbers of nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols. In this context, a protocol consists of a set of rules defining how the nodes interact with each other.

Computer networks may be further interconnected by an intermediate network node, such as a switch or router, having a plurality of ports that may be coupled to the networks. To interconnect dispersed computer networks and/or provide Internet connectivity, many organizations rely on the infrastructure and facilities of Internet Service Providers (ISPs). ISPs typically own one or more backbone networks that are configured to provide high-speed connection to the Internet. To interconnect private networks that are geographically diverse, an organization may subscribe to one or more ISPs and couple each of its private networks to the ISP's equipment. Here the router may be utilized to interconnect a plurality of private networks or subscribers to an IP "backbone" network. Routers typically operate at the network layer, i.e., layer 3, of a communications protocol stack, such as the internetwork layer of the Transmission Control Protocol/Internet Protocol (TCP/IP) communications architecture.

Simple networks may be constructed using general-purpose routers interconnected by links owned or leased by ISPs. As networks become more complex with greater numbers of elements, additional structure may be required. In a complex network, structure can be imposed on routers by assigning specific jobs to particular routers. A common approach for ISP networks is to divide assignments among access routers and backbone routers. An access router provides individual subscribers access to the network by way of large numbers of relatively low-speed ports connected to the subscribers. Backbone routers, on the other hand, provide transports to Internet backbones and are configured to provide high forwarding rates on fast interfaces. ISPs may impose further physical structure on their networks by organizing them into points of presence (POP). An ISP network usually consists of a number of POPs, each of which comprises a physical location wherein a set of access and backbone routers is located.

As Internet traffic increases, the demand for access routers to handle increased density and backbone routers to handle greater throughput becomes more important. In this context, increased density denotes a greater number of subscriber ports that can be terminated on a single router. Such requirements can be met most efficiently with platforms designed for specific applications. An example of such a specifically designed platform is an aggregation router. The aggregation router is an access router configured to provide high quality of service and guaranteed bandwidth for both data and voice traffic destined for the Internet. The aggregation router also provides a high degree of security for such traffic. These functions are considered "high-touch" features that necessitate substantial processing of the traffic by the router. More notably, the aggregation router is configured to accommodate increased density by aggregating a large number of leased lines from ISP subscribers onto a few trunk lines coupled to an Internet backbone.

In a typical implementation of a router, a processor is provided to process an original header of a packet while leaving the remainder of the packet, i.e., the "trailer", unchanged. In a high-end router implementation using a network processor, dedicated hardware is provided to efficiently pass the original packet header to a forwarding engine. The forwarding engine may be implemented as a "chip", e.g., an application specific integrated circuit (ASIC), comprising a plurality of processors operating in a serial "pipeline" configuration to process (modify) the packet header. Only the original packet header is brought "on-chip" to reduce the memory and bandwidth requirements for the forwarding engine; the entire packet, including the packet trailer, is held in a small buffer of the dedicated hardware.

As part of the packet header processing, the processors may parse ("strip off") portions of the original packet header, such as a layer 2 header or a tunnel header, and examine a layer 3 header or a layer 4 header to determine the destination for the packet. The processors may further modify portions of the layer 3 or 4 headers and add new headers associated with the outgoing interface or tunnel. Once the packet header has been modified, it is rejoined (merged) with the packet trailer and placed into a buffer of an external memory. Thereafter, the merged packet is "queued" (i.e., placed on an output queue) to an output interface or link where it awaits output scheduling.

There are several advantages to not placing the original packet into the external memory buffer until packet header processing has been completed. In some implementations, there may be separate output buffers (per outgoing interface) such that selection of an output buffer is not determined until after packet processing. Even in cases where a single memory is used for the output buffers, it is more "memory bandwidth" efficient to write (move) the modified packet header at the same time as the packet trailer. In order to move the entire merged packet to an output buffer at one time, the entire original packet beyond the packet header must be held for the time that it takes the pipeline of processors to complete the packet header processing.

As noted, the small buffer, e.g., an internal packet memory buffer, of the dedicated hardware is typically used to hold the entire original packet, including the packet header. The dedicated hardware may also be embodied as an ASIC chip. Since the internal packet buffer is "small", it may be implemented on the dedicated hardware chip along with direct memory access (DMA) logic and external memory interface logic. The minimum size of the packet buffer is determined by a maximum packet size plus the time needed to process a packet header through the processor pipeline. If the hardware chip is coupled to multiple line cards of the router via multiple links, multiple internal packet buffers may be required. To enable these buffers to be implemented "on-chip", their sizes must be kept as small as possible. Therefore, each internal packet buffer may not comprise a binary number of entries in length. Moreover, the packets are typically stored sequentially in the packet buffer to optimize usage of that memory resource and, therefore, may not start on binary boundaries.

When an original packet header is passed to the processors, a pointer is provided to the processors indicating a location of the original packet in the internal packet buffer. When the processors create the new modified packet header, they may issue DMA commands to move the modified header, along with the packet trailer from packet buffer as specified by an internal packet buffer address, to the external memory buffer. Since the internal packet buffer may contain the entire packet including the original packet header that has been subsequently modified, the DMA command typically specifies the location within the buffers as a displacement from the address of the original entire packet, computed based upon the new modified packet header.

SUMMARY OF THE INVENTION

The present invention comprises a mapping technique for efficiently computing an adjusted starting address within an internal packet memory (IPM) configured to hold a packet received at an intermediate network node. The adjusted starting address is used by direct memory access (DMA) logic to merge a trailer of the packet stored in the IPM with a modified packet header generated by a forwarding engine of the node. However, the IPM is "oddly-sized"; that is, the IPM size is preferably not a binary number that can be easily manipulated by the forwarding engine when computing the starting address of the packet within the IPM. Therefore, the technique automatically adjusts the starting address to map to a correct location if the address exceeds the size of the IPM. In addition, the mapping technique obviates the need for the forwarding engine to consider a wrap-around condition when computing the adjusted starting address.

In the illustrative embodiment, the size of the IPM is preferably 11 KB (e.g., 0x2C00) and the starting address is preferably 16 bits, e.g., bits 0–15. According to the invention, the DMA logic adjusts the starting address by logically "zeroing" the high order bit, i.e., bit 15, of the address and then subtracting 0x2C00 if the result is greater than or equal to the IPM size to thereby arrive at the correct adjusted starting address within the IPM. Advantageously, the inventive technique conserves processor cycles within the forwarding engine in order to achieve maximum throughput.

That is, the mapping technique saves processor cycles by eliminating a requirement to check for address "roll over" as well as eliminating a need to perform masking and combining operations when performing address calculations by providing protection bits in the address space.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
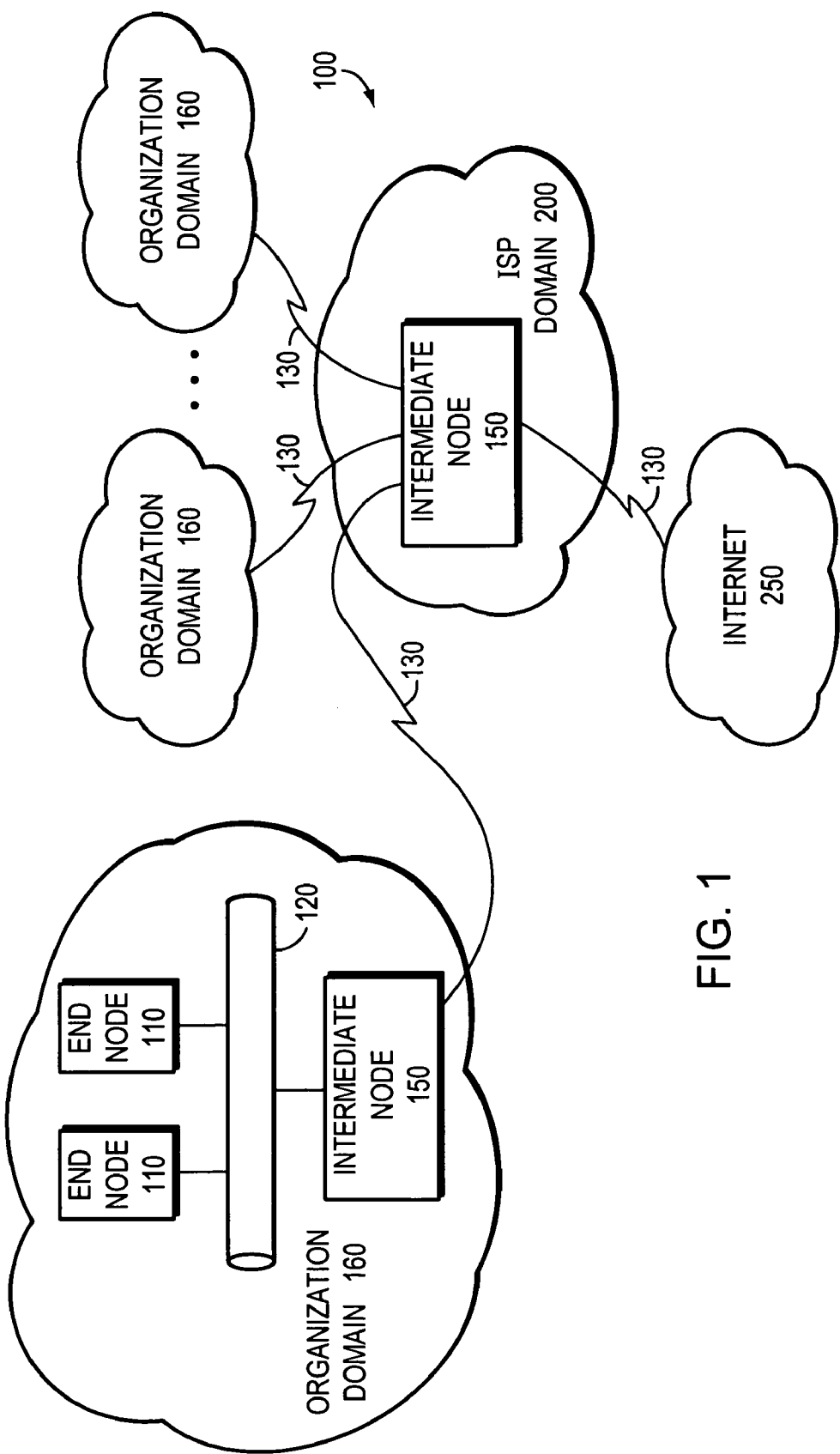
FIG. 1 is a schematic block diagram of a network including a collection of communication links and segments organized into a plurality of subscriber domains coupled to an Internet service provider (ISP) domain.

FIG. 1 is a schematic block diagram of a computer network 100 comprising a collection of communication links and segments connected to a plurality of nodes, such as end nodes 110 and intermediate nodes 150. The network links and segments may comprise local area networks (LANs) 120 and wide area network (WAN) links 130 interconnected by intermediate nodes 150, such as network switches or routers, to form an internetwork of computer nodes. These internetworked nodes communicate by exchanging data packets according to a predefined set of protocols, such as the Transmission Control Protocol/Internet Protocol (TCP/IP). It should be noted that other techniques/protocols, such as the Hypertext Transfer Protocol (HTTP), may be advantageously used with the present invention.

Figure 2:
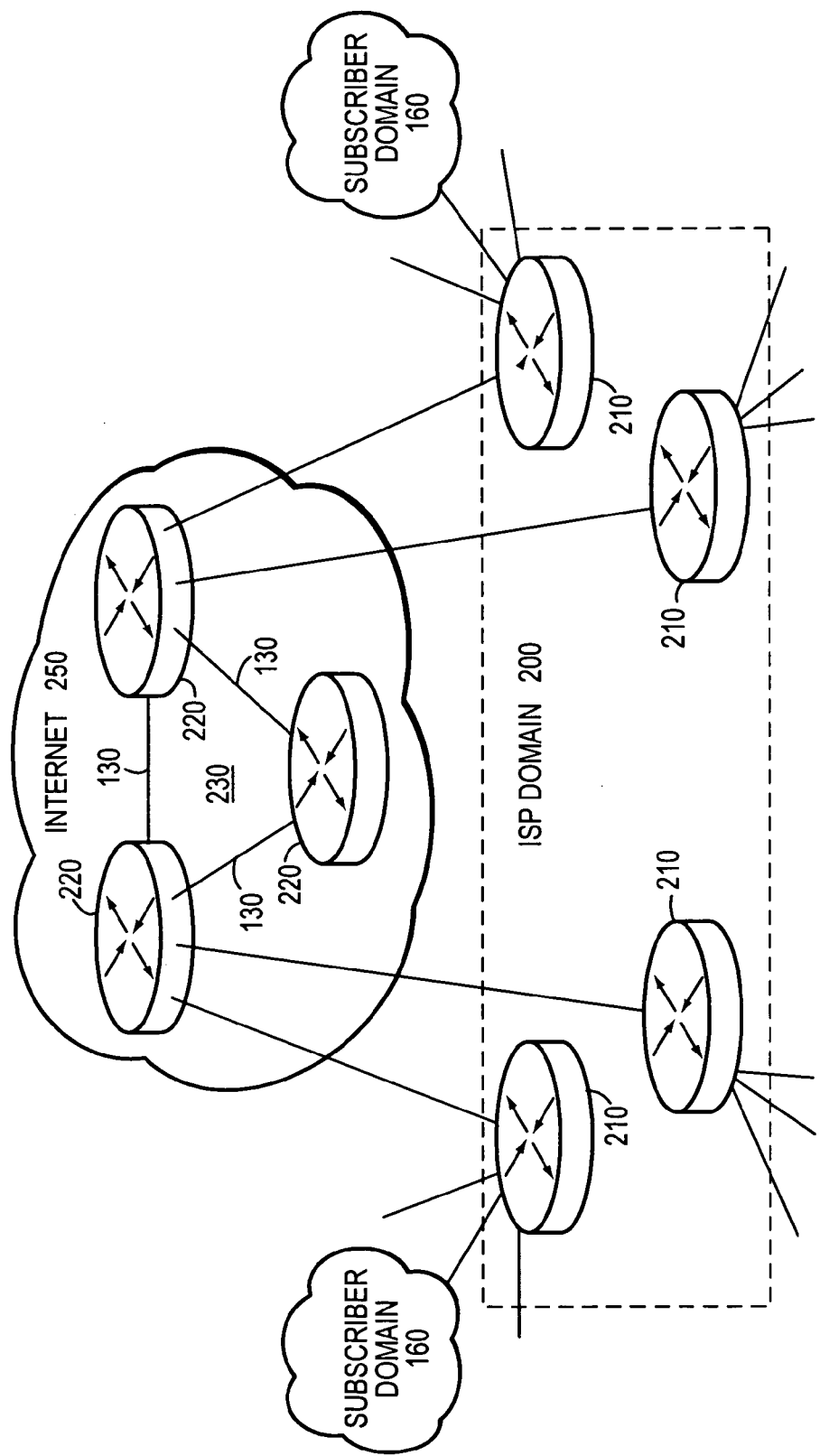
FIG. 2 is a schematic block diagram of an ISP domain comprising a plurality of interconnected access and backbone routers.

To interconnect their dispersed private computer networks and/or provide Internet connectivity, many organizations rely on the infrastructure and facilities of Internet service providers (ISPs) rather than purchase and configure the necessary equipment themselves. In the illustrative embodiment, the computer network 100 is organized into a plurality of domains, including organization domains 160 of private networks coupled to an ISP domain 200. An organization 160 may subscribe to one or more ISPs 200 and couple each of its private networks to the ISP's equipment. FIG. 2 is a schematic block diagram of an ISP domain 200 comprising a plurality of interconnected access and backbone routers 210, 220. The access routers 210 connect the individual organization or subscriber domains 160 to the backbone routers 220 via relatively low-speed ports connected to the subscribers. The backbone routers 220 are interconnected by WAN links 130 to form one or more backbone networks 230 configured to provide high-speed, high-capacity, wide area connectivity to the Internet, represented herein as Internet cloud 250.

Figure 3:
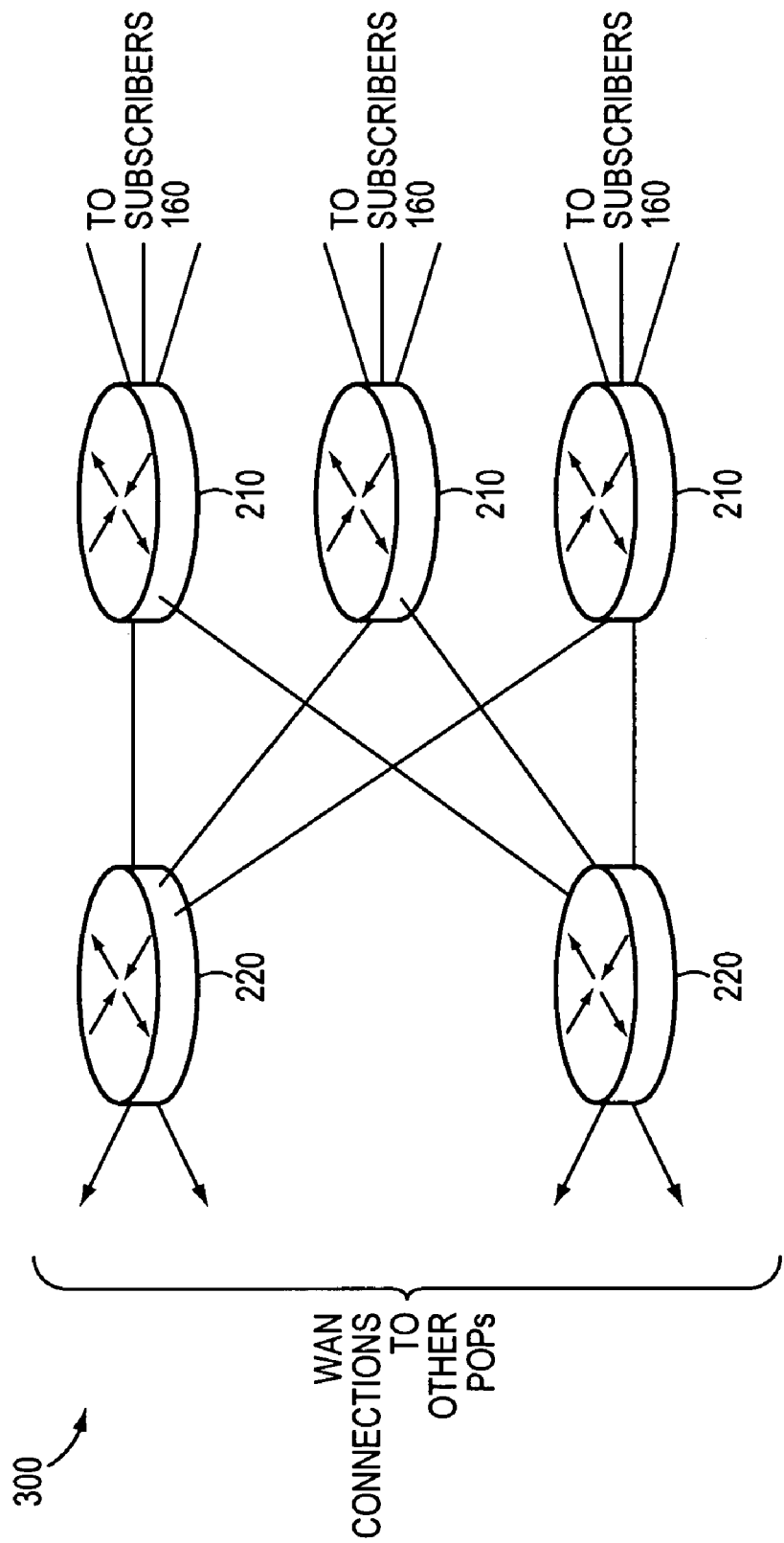
FIG. 3 is a schematic block diagram of an illustrative embodiment of an ISP point of presence (POP) that may be advantageously used with the present invention.

An ISP domain 200 may be further organized into points of presence (POP), each of which comprises a physical location wherein a set of access and backbone routers is located. FIG. 3 is a schematic block diagram of an illustrative embodiment of a POP 300 that may be advantageously used with present invention. The POP 300 comprises a plurality of backbone routers 220 coupled to access routers 210 equipped with redundant trunk connections. The use of more than one backbone router enhances network availability, as does the use of redundant trunk connections on the access routers. The backbone routers 220 and access routers 210 are maintained separately so that backbone router configuration can be kept relatively stable over time. Backbone routers are not affected when individual subscribers add or remove value-added services or when individual subscribers are added to or removed from the access routers 210. In addition, access routers can be added as new subscribers are brought onto the network.

As Internet traffic increases, the demand for access routers 210 to handle increased density, and backbone routers 220 to handle greater throughput, becomes more important. Increased density denotes a greater number of subscriber ports that can be terminated on a single access router. An aggregation router is an access router configured to accommodate increased density by aggregating a large number of leased lines from ISP subscribers onto a few trunk lines coupled to an Internet backbone. That is, the aggregator essentially functions as a large "fan-in" device wherein a plurality of relatively low-speed subscriber input links is aggregated onto at least one high-speed output trunk to a backbone network of the Internet.

Figure 4:
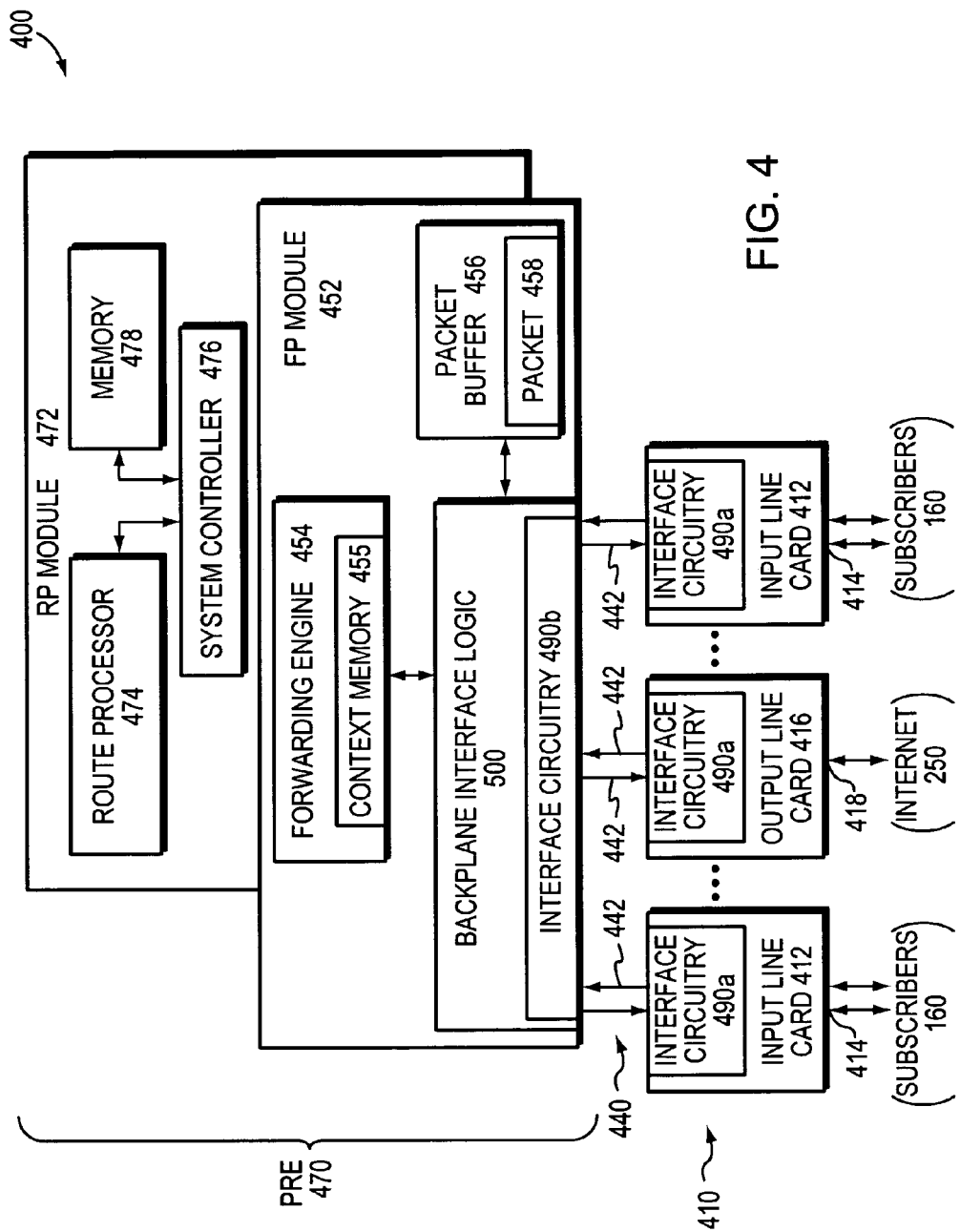
FIG. 4 is a schematic block diagram of an aggregation router that may be advantageously used with the present invention.

FIG. 4 is a schematic block diagram of an aggregation router 400 that may be advantageously used with the present invention. The aggregation router comprises a plurality of line cards 410 coupled to at least one performance routing engine (PRE 470) via a unidirectional (i.e., point-to-point) interconnect system 440. The line cards 410 include a plurality of input cards 412 having input ports 414 coupled to subscribers 160 and at least one output "trunk" card 416 configured to aggregate the subscriber inputs over at least one output port 418. The PRE 470 is an assembly comprising a fast packet "forwarding" processor (FP) module 452 and a router process (RP) module 472 adapted to perform packet forwarding and routing operations, respectively. The FP and RP modules are preferably interconnected in a "mezzanine" arrangement to form the PRE 470. The PRE assembly also provides quality of service (QoS) functions for complete packets received from each input line card over the interconnect system. To that end, the interconnect system 440 comprises a plurality of high-speed unidirectional links 442 coupling the PRE to each line card 410.

The RP module 472 is a processor-based, routing system suite comprising functionality incorporated within a typical router. That is, the RP module comprises a general-purpose processor 474 (e.g., a MIPS route processor) coupled to a system controller 476 and memory 478. A network routing operating system, portions of which are typically resident in memory 478 and executed by the route processor, functionally organizes the router by, inter alia, invoking network operations in support of software processes executing on the router. The route processor 474 is configured to construct and load routing tables used by the FP module 452. The processor 474 also performs configuration management functions of the aggregation router 400 and communicates with neighboring peer routers to exchange protocol data units used to construct the routing tables in accordance with conventional routing algorithms.

The FP module 452 is responsible for rendering forwarding decisions for the aggregation router and, to that end, includes a forwarding engine 454 (such as an arrayed processing engine) coupled to a high-performance backplane interface logic circuit 500. The forwarding engine 454 is preferably embodied as two high performance "chips", e.g., application specific integrated circuits (ASICs) having a plurality of processors arrayed as four (4) rows and eight (8) columns in a 4×8 arrayed configuration, wherein each column is coupled to a column memory. However, it will be understood to those skilled in the art that other arrayed configurations, such as an 8×2 or 8×8 array, may be used in accordance with the present invention. The column memory preferably comprises synchronous dynamic random access memory (SDRAM) storage locations addressable by the forwarding engine 454 for storing software code and data structures accessed by the processors. The software code is preferably a binary, assembly language image or micro-code adapted for execution by processors of the engine 454. It will be apparent to those skilled in the art that other memory means, including various computer readable media, may be used for storing and executing program instructions pertaining to the operation of the forwarding engine.

The aggregation router 400 illustratively includes sixteen (16) line cards 410, each of which may be configured for an OC-12 (622 Mbps) data rate. Thus, the point-to-point links 442 coupled to the line cards must be capable of supporting such data rates. An interconnect protocol is provided that enables encoding of packets over the point-to-point links of the interconnect system to thereby limit the bandwidth consumed by overhead when transmitting the packets within the aggregation router. An example of an interconnect protocol that may be advantageously used with the present invention is disclosed in co-pending and commonly-owned U.S. patent application Ser. No. (112025-0439) titled High Performance Protocol for an Interconnect System of an Intermediate Network Node, which application is hereby incorporated by reference as though fully set forth herein.

Interface circuitry 490 coupled to the ends of the unidirectional links 442 is resident on both the line cards 410 and the backplane logic circuit 500. The backplane logic circuit is also preferably embodied as a high performance chip (i.e., ASIC), hereinafter referred to as the Cobalt ASIC, which is configured to further interface the line cards to a packet buffer 456 of the FP module. The packet buffer 456 preferably comprises SDRAM devices used to store packets 458 as the forwarding engine 454 determines where and when they should be forwarded within the aggregation router. For example, the packet buffer may be used to store low priority data packets while high priority, low latency voice packets are prioritized by the forwarding engine to an output card (e.g., the trunk card 416) of the aggregation router. An example of a backplane logic circuit that may be advantageously used with the present invention is disclosed in co-pending and commonly-owned U.S. patent application Ser. No. (112025-0438) titled High Performance Interface Logic Architecture of an Intermediate Network Node, which application is hereby incorporated by reference as though fully set forth herein.

The interface circuitry 490 includes interconnect ports coupled to the point-to-point links 442 of the interconnect system 440 and implements a unidirectional, point-to-point clock forwarding technique that is configured for direct ASIC-to-ASIC transmission over a backplane of the aggregation router. As a result, the interface circuitry 490a resident on the line cards 410 is preferably embodied within a high-performance ASIC, hereinafter referred to as the Barium ASIC, whereas the interface circuitry 490b is resident on the Cobalt ASIC. The interface circuitry generally converts conventional formats of data received at the line card 410 to a protocol format for transmission from, e.g., the Barium ASIC over the interconnect system 440 to the Cobalt ASIC. The ASICs also include circuitry to perform cyclic redundancy code (CRC) generation and checking on packets, along with interconnect format checking.

Figure 5:
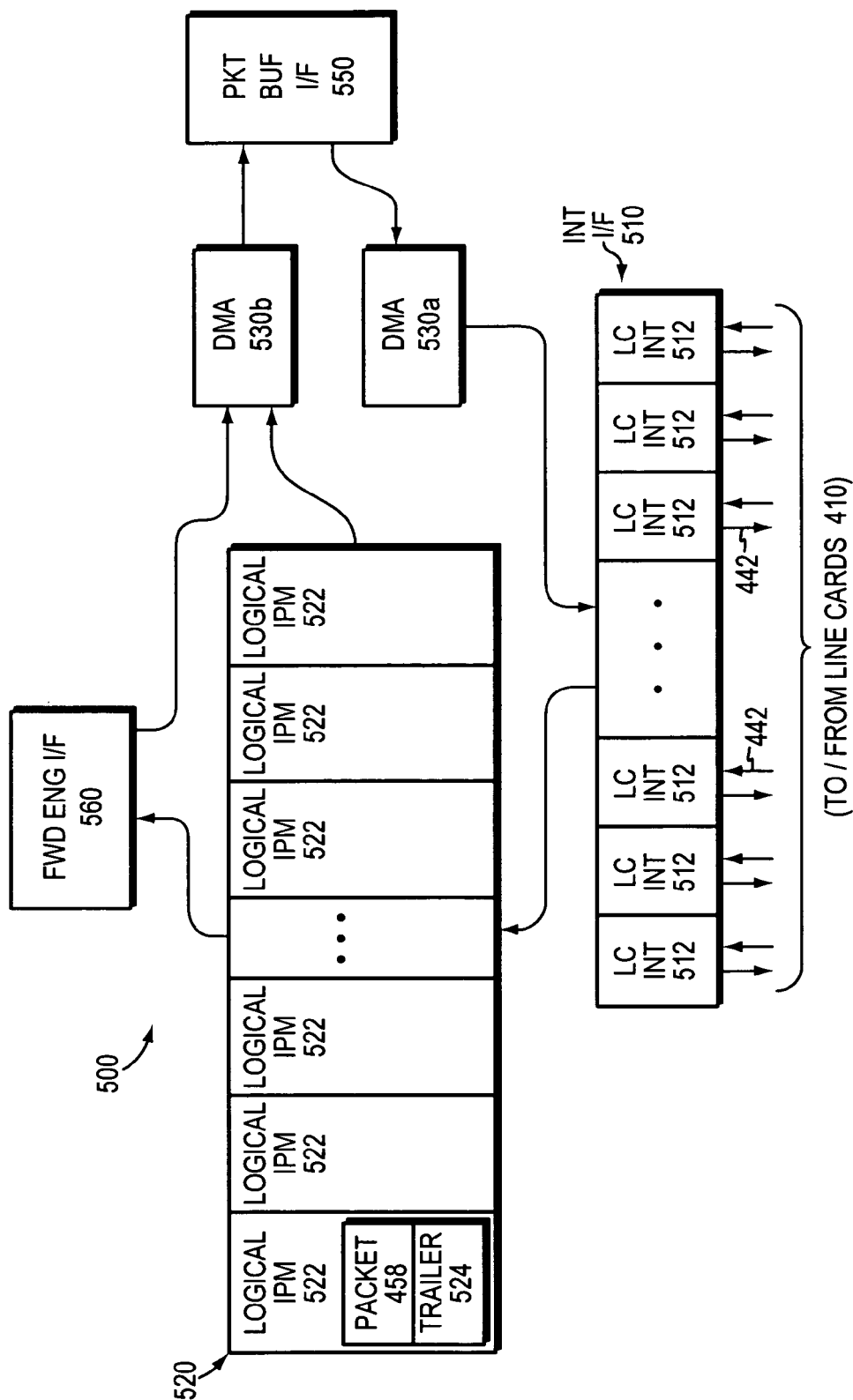
FIG. 5 is a functional block diagram of interface logic circuitry contained on an application specific integrated circuit of the aggregation router.

FIG. 5 is a functional block diagram of the backplane interface logic 500 contained on the Cobalt ASIC in accordance with the present invention. The interface logic circuitry comprises a plurality of high-bandwidth functional circuits including an interconnect interface (Int I/F) section 510 comprising a plurality of (e.g., 16) line card interface circuits (LC Int 512). Each LC Int 512 comprises small, low risk and low power transceiver circuitry coupled a line card 410 over a point-to-point link 442 of the interconnect system 440. In addition, there may be an interface circuit 512 coupled to the route processor 474 over a bus, such as a conventional peripheral computer interconnect (PCI) bus. The Cobalt ASIC 500 also includes a packet buffer interface (Pkt Buf I/F) section 550 comprising read/write circuitry configured to interface with the packet buffer 456, and a forwarding engine interface (Fwd Eng I/F) section 560 comprising read/write circuitry for interfacing with the forwarding engine 454.

The backplane interface logic 500 also includes an internal packet memory (IPM 520) for temporarily storing the packets 458, including their payloads (i.e., "trailers" 524), while the forwarding engine 454 processes the headers of the packets. In the illustrative embodiment, the IPM 520 is preferably a single memory that is partitioned into a plurality of logical IPMs 522, each of which is associated with a line card (and the route processor). A plurality of direct memory access (DMA) logic controllers (i.e., DMA engines 530) controls the movement of data to and from the line cards 410, the packet buffer 456 and the forwarding engine 454. As described herein, the forwarding engine 454 generates commands to the DMA engines 530 to enable merging of processed headers with their trailers and transferring of data to and from the packet buffer 456. Here, a first DMA engine 530a facilitates data transfers from the Pkt Buf I/F 550 to the LC Int 512. A second DMA engine 530b facilitates merging of an updated (new) header from the Fwd Eng I/F 560 with its corresponding trailer retrieved from the IPM 520 for delivery to the Pkt Buf I/F 550.

Broadly, stated, a packet 458 is initially received at an input port 414 of a line card 412 and, after minimal buffering, is sent over a point-to-point link 442 to the Cobalt ASIC 500 where it is temporarily stored in the IPM 520. During normal packet processing, the Cobalt ASIC sends an original header of the packet to the forwarding engine for processing and holds the entire packet 458, including its trailer 524, in a logical IPM 522 until receiving further instructions/commands from the forwarding engine. As a result, the entire packet must be received and stored in the logical IPM 522 before the header is sent to the forwarding engine. The original packet header may comprise a plurality of individual headers, including conventional layer 2, layer 3, and layer 4 headers. The forwarding engine processes (modifies) the original packet header and returns a modified packet header along with several commands that instruct the DMA engine 530b to move the header and its packet trailer into the packet buffer 456. At the appropriate time, the forwarding engine 454 generates commands that instruct the DMA engine 530a to move the merged packet from packet buffer 456 to an appropriate line card 416.

Figure 6A:
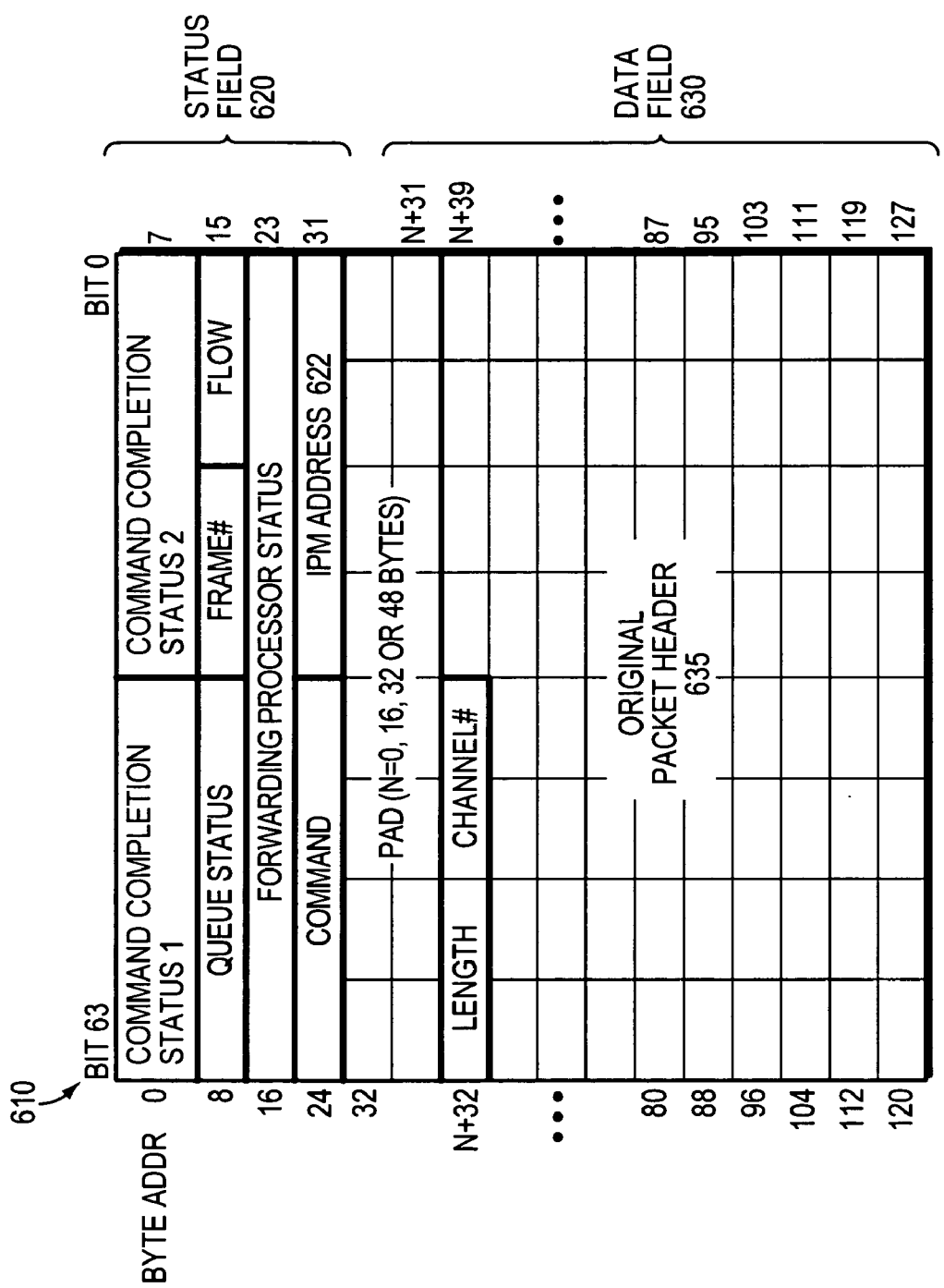
FIG. 6A is a schematic block diagram of a new work context that may be advantageously used with the present invention.

For each packet received from a line card 412 over the interconnect system 440, the Cobalt ASIC generates a context (e.g., a new work context) that notifies the forwarding engine 454 that a complete new packet 458 is available from the IPM 522. The original header of the packet is then copied into the new work context and passed to the forwarding engine where it is stored in a context memory 455 associated with each processor of the engine 454. FIG. 6A is a schematic block diagram of the new work context 610 that, illustratively, is 128 bytes in length. A 32-byte status field 620 contains status (state) information, such as output command completion status, queue status and forwarding processing status. Also included within the status field 620 is an IPM address field 622 for storing an original starting address of the complete packet in a logical IPM 522. The remainder of the context, i.e., a data field 630, accommodates an original packet header 635 that is modified by the forwarding engine 454.

The IPM 520 is a critical resource of the Cobalt ASIC, and, accordingly, it is desirable to provide only the minimum amount of IPM memory that is needed for proper operation of the aggregation router 400. Yet, as noted, the forwarding engine does not process a packet header until the entire packet is received at the IPM. Therefore, at a minimum, each logical IPM 522 requires sufficient capacity to accommodate a maximum size packet having a maximum transfer unit (MTU) length of, e.g., 9 KB. Once the entire 9 KB packet is received at the IPM, its original packet header 635, including a channel number and packet length, is passed to the forwarding engine for processing.

Figure 6B:
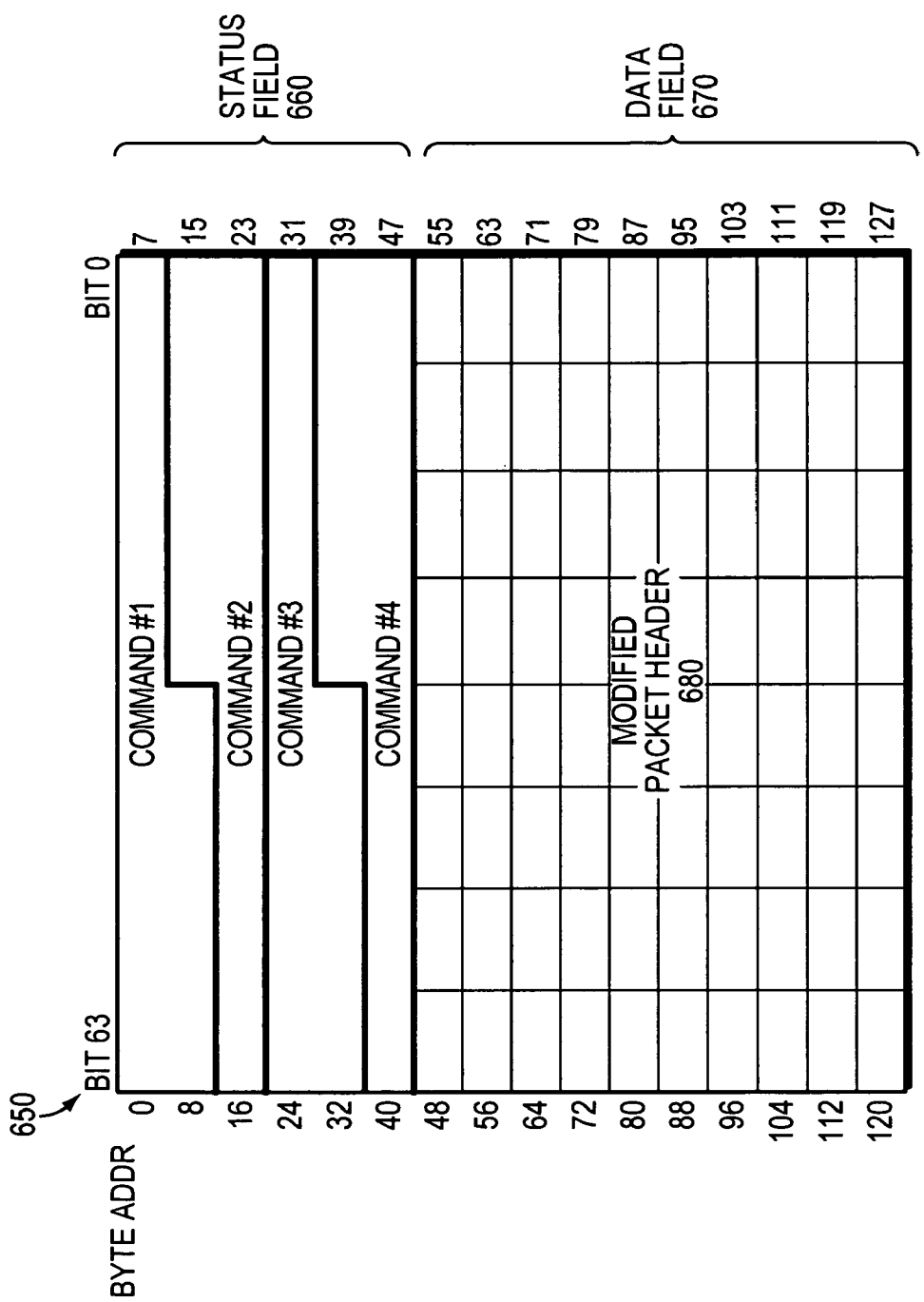
FIG. 6B is schematic block diagram of a processed context that may be advantageously used with the present invention.

The processors generate a new modified packet header and compute a starting address for the packet trailer 524 in the logical IPM 522. The processors deliver the modified packet header, along with move commands, to the DMA engine 530b in a "processed" context. FIG. 6B is a schematic block diagram of a processed context 650 delivered by the forwarding engine 454 to the Cobalt ASIC. A status field 660 of the context contains, e.g., 4 move commands that are preferably executed in order, starting with command #1, by the DMA engine 530b. The move commands instruct the DMA engine to move the modified packet header 680 (stored in data field 670) from the processed context 650, along with the packet trailer 524 from the computed starting address of the logical IPM 522, to the packet buffer 456. As the packet data is moved from the IPM, the portion of logical IPM 522 storing the data is optionally "freed" (de-allocated) so that it can be overwritten by new packets received from the line card 412 associated that logical IPM.

During packet header processing, additional packets may be received at the line card and forwarded to its associated logical IPM 522 for temporary storage such that the IPM begins to "fill up" with these additional packets. Notably, the latency associated with processing of a packet header is relatively small compared to the latency associated with transmitting packets 458 from a line card 412 over the interconnect system 440 to the IPM. In order to accommodate this relatively small latency, each logical IPM 522 is configured with additional storage capacity (i.e., "space") beyond the MTU packet length. In the illustrative embodiment, this additional space is 2 KB such that the total size of each logical IPM is 11 KB. However, 11 KB is an "oddly-sized" address space in that it is not a typical binary number that can be easily manipulated by the forwarding engine (i.e., micro-code) when computing a starting address in the logical IPM 522 for inclusion in the move command.

Furthermore, each logical IPM 522 is preferably configured as a circular buffer with addresses that "wrap around" as new packets are received from the line card. If the IPM had a length that conforms to a "natural" boundary (e.g., 16 KB) then computation of the starting addresses for these new packets would be straightforward, even for a circular memory buffer such as the IPM. For example if the starting address of a packet is 16 K+4, the DMA engine would merely ignore the high-order bit and arrive at a starting address of 4 within the logical IPM. However, the size of the IPM is 11 KB, which does not align to a natural binary (bit address) boundary. As a result, the DMA engine logic of the Cobalt ASIC is configured to perform a novel "fix up" operation on the starting addresses specified in the move command.

Figure 7:
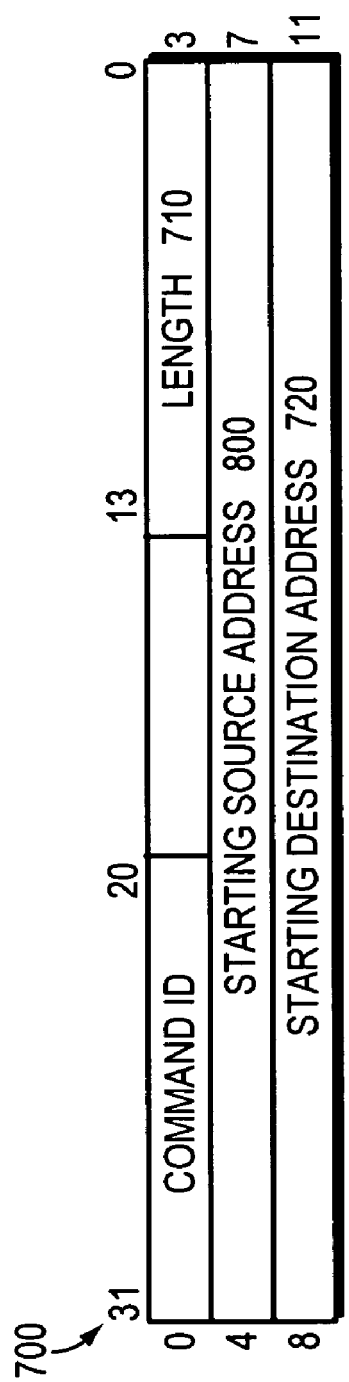
FIG. 7 is a schematic block diagram illustrating the format of a move command that may advantageously used with the present invention.
Figure 8:
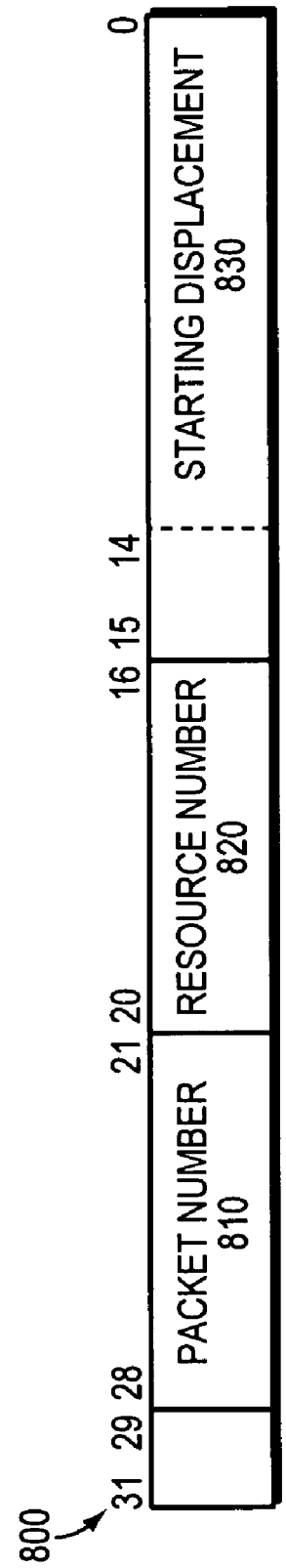
FIG. 8 is a schematic block diagram illustrating the format of a starting source address field that may be advantageously used with the present invention.

FIG. 7 is a schematic block diagram illustrating the format of a move command 700 that includes, inter alia, a length field 710 indicating the total length (bytes) of data to be moved, a starting source address field 800 and a starting destination address field 720. The contents of the latter fields specify the starting points for moving data among, e.g., various memories (the packet buffer 456 and IPM 520) and contexts, such as the processed context 650. FIG. 8 is a schematic block diagram illustrating the format of a starting source address field 800 within the move command 700. The starting source address format is similar to that of the IPM address stored in field 622 of the new work context 610. Specifically, a packet number field 810 contains an identifier of a selected original packet, while a resource number field 820 contains an identification of a particular logical IPM 522 within the Cobalt ASIC 500. The content of a starting displacement field 830 is a value comprising the lower-order 16 bits of the starting source address and indicating a location within the logical IPM 522 at which to begin moving the selected packet.

The starting displacement value is computed by the forwarding engine as a straight addition to the IPM address passed to the forwarding engine. The original IPM address loaded into field 622 of the new work context 610 has values in the range of 0x0000–0x2BFF. In the illustrative embodiment, however, 16 bits are not needed for the starting displacement value. The two extra high-order bits (e.g., bits 14 and 15) are set to zero in the new work context 610. These high-order bits of the starting displacement field 830 are preferably provided so that the micro-code executing on the forwarding engine can perform a straight addition to the IPM address when computing the starting displacement value. Any carry of this addition only affects the two "zeroed" bits 14 and 15, not the adjacent field 820. Therefore, the fix-up operation performed by the DMA engine involves logically "zeroing" the high-order bit 15 and then subtracting the value of the IPM size, e.g., 0x2C00.

Specifically, a mapping technique is provided that allows the processors (micro-code) of the forwarding engine to easily compute an adjusted starting address within the logical IPM where the packet trailer resides so that it can be merged with a modified packet header generated by processors. The technique also obviates the need for the forwarding engine to consider a wrap-around condition when computing the starting displacement address. To that end, the DMA engine 530b is configured to automatically adjust this address to map to a correct location if the address exceeds the illustrative 11 KB threshold (e.g., 0x2C00).

According to the invention, the DMA logic adjusts the starting address by logically "zeroing" bit 15 of the address, and then subtracting 0x2C00 if the result is greater than or equal to the IPM size to thereby arrive at the correct adjusted starting address in the IPM. This results in a 14-bit address in the range of 0x0000 to 0x2BFF (i.e., the range of valid addresses within the IPM). This technique obviates the need for the forwarding engine micro-code to "mask" the 16-bit starting address to enable implementation by the DMA engine. Moreover, a situation should not arise where a value is added to an IPM address that results in a wrap-around operation that, in turn, requires masking by the micro-code. Rather, the added value is reflected as additional bits in the IPM address and the DMA engine adjusts the address as described above.

For example, assume that a packet 458 stored in logical IPM 522 starts at an original address location 0x1234 and is 256 bytes in length. The forwarding engine 454 receives the first 64 bytes of the packet in a new work context 610. The amount of the packet that comprises the original packet header 635 is unknown until the processors of the forwarding engine actually examine the context 610. Assume the processors determine that the original packet header is 25 bytes long and, as a result of packet header processing, generate a new modified packet header 680 that is 46 bytes long within a processed context 650. Assume further that the packet trailer 524 starts at location 0x1234+25 or 0x124D in logical IPM 522 and has a length 256–25 or 231. The processors specify this starting location and length in the move command 700, which is passed to DMA engine 530b.

As noted, the length of the illustrative logical IPM 522 is 11 KB (e.g., 0x2C00). If the packet 458 is stored at a different original starting IPM address, e.g., 0x2BF0, then the processors compute the starting address of the trailer 524 as 0x2BF0+25 or 0x2C09. However, the last valid address within the logical IPM 522 is 0x2BFF. The processors could include check operations directed to "wrapping around" the IPM and subtracting the length of the logical IPM (e.g., 0x2C00), but such operations waste precious processor cycles. Instead, according to the present invention, the DMA engine 530b automatically adjusts the starting address, if greater than the length of the logical IPM, to reflect the correct adjusted starting address as 0x0009.

To further complicate addressing, it is possible that the processors address a "tail end" of the packet 458 in logical IPM 522. This may occur when a packet is fragmented into multiple packets. Here, the processors may specify the last 256 bytes of an 8 KB packet. If the packet starts at address 0x2BF0 of the logical IPM, the computed address of the last 256 bytes is 0x2BF0+0x1F00 or 0x4AF0. This represents a 15-bit address. If the high-order bit of the computed address is simply ignored, then the address would be incorrectly interpreted as 0x0AF0 instead of 0x1EF0. Further, since the IPM 520 contains multiple, logical IPMs, the higher bits of the IPM address (i.e., stored in IPM address field 622) are used to indicate within which logical IPM the packet is stored. If the high-order bits 15 and 14 of the address were not provided in the IPM address field, a "roll over" of the lower bits of the IPM address would incorrectly alter the selection of the appropriate logical IPM 522.

As a result, the Cobalt ASIC provides a minimum 16-bit lower IPM address field, with a higher address field (e.g., bits 20–16) indicating which logical IPM 522 stores the particular packet. That is, the ASIC logic loads a value between 0x__0000 and 0x__2BFF in the IPM address field 622 of the new work context 610, wherein the "__" represents the logical IPM number and the lower 16-bits represent the starting address of the packet in that logical IPM 522. For the resulting move commands contained within the processed context, the DMA engine 530*b* interprets the lower 15 bits of the IPM address as the starting displacement within the selected logical IPM, automatically adjusting for the wrap around condition.

Advantageously, the inventive technique described herein conserves processor cycles in order to achieve maximum throughput in the forwarding engine. That is, the mapping technique saves processor cycles by eliminating the requirement to check for address "roll over" as well as eliminating the need to perform masking and combining operations when performing address calculations by providing protection bits in the address space. Moreover, the invention requires only a single instruction to compute the starting displacement address whereas, in the absence of the invention, at least two instructions would be required to add and mask (assuming an aligned size of the IPM address space). For an oddly sized IPM space, more than two instructions would be required.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for efficiently computing an adjusted starting address in a memory of an intermediate network node, the memory having an oddly-sized address space configured to hold a packet received at the intermediate network node, the method comprising the steps of:
   passing an original starting address of the packet in the memory to a forwarding engine of the intermediate network node;
   computing a starting displacement value using the original starting address, the starting displacement value represented as a high order bit and remaining bits;
   logically zeroing the high order bit of the starting displacement value; and
   subtracting a maximum value of the oddly-sized address space to thereby compute the adjusted starting address in the memory.

2. The method of claim 1 further comprising the steps of:
   providing a plurality of line cards at the intermediate network node;
   providing an internal packet memory (IPM) in the memory;
   partitioning the IPM into a plurality of logical IPMs, each logical IPM associated with a line card;
   receiving the packet at one of the line cards; and
   storing the packet in a logical IPM associated with the line card, the packet including an original packet header and a trailer.

3. The method of claim 2 wherein the step of passing comprises the steps of:
   generating a new work context, the new work context notifying the forwarding engine that the packet is available from the logical IPM;
   copying the original packet header of the packet into the new work context; and
   passing the new work context to the forwarding engine, the new work context containing the original starting address of the packet in the logical IPM.

4. The method of claim 3 wherein the step of computing comprises the steps of:
   determining a length of the original packet header; and
   adding the length to the original starting address to compute the starting displacement value.

5. The method of claim 4 wherein the adjusted starting address is an address of the trailer in the logical IPM.

6. The method of claim 4 further comprising the step of processing the original packet header of the new work context to generate a modified packet header contained in a processed context, the processed context further containing at least one move command.

7. The method of claim 6 wherein the at least one move command comprises a starting source address field that includes the starting displacement value.

8. The method of claim 7 wherein the high order bit and remaining bits of the starting displacement value comprise lower order bits of the adjusted starting address, the starting displacement value indicating a location within the logical IPM at which to begin moving the packet.

9. The method of claim 8 further comprising the steps of:
   delivering the modified packet header and the at least one move command in the processed context to direct memory access (DMA) logic of the intermediate network node; and
   instructing the DMA logic, by way of the at least one move command and starting displacement value, to move the trailer, along with the modified packet header into a packet buffer.

10. A system for efficiently computing an adjusted starting address in a memory of an intermediate node of a computer network, the memory having an oddly-sized address space configured to hold a packet received at the intermediate node, the system comprising:
    an interface logic circuit coupled to a line card, the interface logic circuit including the memory for holding a trailer of the packet, the interface logic circuit generating a new work context containing a starting address of the packet in the memory;
    a forwarding engine coupled to the interface logic circuit and adapted to receive the new work context from the interface logic circuit, the forwarding engine processing the new work context to generate a processed context containing at least one move command having a starting displacement address of the trailer in the memory, the starting displacement address represented as a high order bit and remaining bits; and
    a direct memory access (DMA) engine of the interface logic circuit, the DMA engine adapted to receive the processed context from the forwarding engine and automatically adjust the starting displacement address to map to the adjusted starting address of the trailer in the memory.

11. The system of claim 10 wherein the intermediate node is a router.

12. The system of claim 10 wherein the intermediate node is an aggregation router.

13. The system of claim 10 wherein the forwarding engine is embodied as at least one chip and wherein the interface logic circuit is embodied as another chip.

14. The system of claim 13 wherein each chip is an application specific integrated circuit.

15. The system of claim 13 wherein the memory is an internal packet memory contained on the another chip.

16. The system of claim 10 wherein the DMA engine automatically adjusts the starting displacement address by logically zeroing the high order bit of the starting displacement address and subtracting a maximum value of the oddly-sized address space to thereby compute the adjusted starting address of the trailer in the memory.

17. Apparatus for efficiently computing an adjusted starting address in a packet memory of a router, the packet memory having an oddly-sized address space configured to hold a packet received at the router, the apparatus comprising:
  means for passing an original starting address of the packet in the packet memory to a forwarding engine of the router;
  means for computing a starting displacement value using the original starting address, the starting displacement value represented as a high order bit and remaining bits;
  means for logically zeroing the high order bit of the starting displacement value; and
  means for subtracting a maximum value of the oddly-sized address space to thereby compute the adjusted starting address in the memory.

18. The apparatus of claim 17 further comprising:
  means for receiving the packet at the router;
  means for providing an internal packet memory (IPM) in the memory;
  means for storing the packet in the IPM, the packet including an original packet header and a trailer.

19. The apparatus of claim 18 wherein the means for passing comprises:
  means for generating a new work context, the new work context notifying the forwarding engine that the packet is available from the IPM;
  means for copying the original packet header of the packet into the new work context; and
  means for passing the new work context to the forwarding engine, the new work context containing the original starting address of the packet in the IPM.

20. The apparatus of claim 19 wherein the means for computing comprises:
  means for determining a length of the original packet header; and
  means for adding the length to the original starting address to compute the starting displacement value.

21. A computer readable medium containing executable program instructions for efficiently computing an adjusted starting address in a memory of an intermediate network node, the memory having an oddly-sized address space configured to hold a packet received at the intermediate network node, the executable program instructions comprising program instructions for:
  passing an original starting address of the packet in the memory to a forwarding engine of the intermediate network node;
  computing a starting displacement value using the original starting address, the starting displacement value represented as a high order bit and remaining bits;
  logically zeroing the high order bit of the starting displacement value; and
  subtracting a maximum value of the oddly-sized address space to thereby compute the adjusted starting address in the memory.

22. The computer readable medium of claim 21 further comprising program instructions for:
  providing a plurality of line cards at the intermediate network node;
  providing an internal packet memory (IPM) in the memory;
  partitioning the IPM into a plurality of logical IPMs, each logical IPM associated with a line card;
  receiving the packet at one of the line cards; and
  storing the packet in a logical IPM associated with the line card, the packet including an original packet header and a trailer.

23. The computer readable medium of claim 22 wherein the program instruction for passing comprises program instructions for:
  generating a new work context, the new work context notifying the forwarding engine that the packet is available from the logical IPM;
  copying the original packet header of the packet into the new work context; and
  passing the new work context to the forwarding engine, the new work context containing the original starting address of the packet in the logical IPM.

24. The computer readable medium of claim 23 wherein the program instruction for computing comprises program instructions for:
  determining a length of the original packet header; and
  adding the length to the original starting address to compute the starting displacement value.

* * * * *